United States Patent
Akasako

(10) Patent No.: US 8,698,434 B2
(45) Date of Patent: Apr. 15, 2014

(54) MOTOR CONTROL DEVICE THAT CONTROLS D-AXIS CURRENT OF PERMANENT MAGNET SYNCHRONOUS MOTOR

(75) Inventor: Youichi Akasako, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 13 days.

(21) Appl. No.: 13/616,272

(22) Filed: Sep. 14, 2012

(65) Prior Publication Data
US 2013/0093371 A1    Apr. 18, 2013

(30) Foreign Application Priority Data

Oct. 12, 2011 (JP) .................................. 2011-224840
Sep. 4, 2012 (JP) .................................. 2012-194184

(51) Int. Cl.
  *H02P 21/02* (2006.01)
  *H02P 6/08* (2006.01)
(52) U.S. Cl.
  CPC ........................................ *H02P 6/08* (2013.01)
  USPC .................. 318/400.02; 318/400.01; 318/700
(58) Field of Classification Search
  CPC ......................................................... H02P 6/08
  USPC ................. 318/400.02, 400.01, 700
  See application file for complete search history.

(56) References Cited

U.S. PATENT DOCUMENTS 5,920,161 A * 7/1999 Obara et al. .................. 318/139

FOREIGN PATENT DOCUMENTS

JP    2002 95300 A    3/2002
JP    2008-236948 A    10/2008

OTHER PUBLICATIONS

Office Action issued for corresponding Japanese Patent Application No. 2012-194184 mailed Dec. 4, 2012—Japanese Language.
Office Action issued for corresponding Japanese Patent Application No. 2012-194184 mailed Dec. 4, 2012—English Language.

* cited by examiner

*Primary Examiner* — Bentsu Ro
*Assistant Examiner* — David Luo
(74) *Attorney, Agent, or Firm* — Lowe Hauptman & Ham, LLP

(57) ABSTRACT

A motor control device that performs vector control to control a q-axis current and a d-axis current of a permanent magnet synchronous motor independent from each other. The motor control device includes a q-axis current and d-axis current detection unit configured to detect a q-axis current and a d-axis current of a permanent magnet synchronous motor, a q-axis current command value generation unit configured to generate a q-axis current command value, a d-axis current command value generation unit configured to generate a d-axis current command value, in which an amount of rise in the temperature of permanent magnets in a steady state of the permanent magnet synchronous motor is a minimum, and a drive unit configured to drive the permanent magnet synchronous motor.

6 Claims, 4 Drawing Sheets

| ROTATION SPEED | d-AXIS CURRENT |
|---|---|
| $\omega_1$ | $I_{d1}$ |
| $\omega_2$ | $I_{d2}$ |
| $\omega_3$ | $I_{d3}$ |
| ⋮ | ⋮ |
| $\omega_n$ | $I_{dn}$ |

MOTOR CONTROL DEVICE THAT CONTROLS D-AXIS CURRENT OF PERMANENT MAGNET SYNCHRONOUS MOTOR

BACKGROUND OF THE INVENTION

1. Field of the Invention

The present invention relates to a motor control device that performs vector control to control a q-axis current and a d-axis current of a permanent magnet synchronous motor independent from each other in order to generate a torque of a permanent magnet synchronous motor having a stator provided with one of a group of windings and a group of permanent magnets and a rotor provided with the other thereof in a quick and stable manner.

2. Description of Related Art

A motor control device that performs vector control controls, for example, a motor in which an AC voltage from a power source (for example, three-phase AC power source) is applied through a converter, a smoothing capacitor and an inverter. In this case, the motor control device detects a q-axis current and a d-axis current of a permanent magnet synchronous motor based on currents (for example, U-phase current, V-phase current, and W-phase current) flowing through the motor and a position (for example, rotation angle) of a rotor of the motor, and generates a q-axis current command value and a d-axis current command value based on various kinds of commands from an upper control circuit (for example, CNC (computer numerical control)), etc. Then, the motor control device generates a PWM signal based on a difference between the detected q-axis current and the q-axis current command value and a difference between the detected d-axis current and the d-axis current command value and outputs the PWM signal to an inverter to drive the motor.

Conventionally, in a motor control device that performs vector control, in order to make it possible to drive a motor with high efficiency even at high speed when the iron loss becomes large, a motor control device which generates a d-axis current command value, in which loss of iron and copper of a motor is minimum, is proposed, as described in, for example, Japanese Unexamined Patent Publication (Kokai) No. 2008-236948 (JP2008-236948A).

When a permanent magnet synchronous motor in which permanent magnets are provided in one of a stator and a rotor is controlled by a motor control device, thermal demagnetization of the permanent magnets occurs due to overheating, and thus there may be a case where it is no longer possible for the permanent magnet synchronous motor to generate a torque in a quick and stable manner. Consequently, in order to avoid the state where thermal demagnetization of the permanent magnets occurs due to overheating, it is necessary to keep as small as possible an amount of rise in the temperature of the permanent magnet in a steady state of the permanent magnet synchronous motor.

However, in a conventional motor control device that generates a d-axis current command value, in which the loss of iron and copper is minimum, there may be a case where the permanent magnets enter an overheating state and thermal demagnetization of the permanent magnets occurs when the loss concentrates on the stator or rotor provided with the permanents magnet.

SUMMARY OF THE INVENTION

As an aspect, the present invention provides a motor control device capable of avoiding a state where thermal demagnetization of permanent magnets of a permanent magnet synchronous motor occurs due to overheating.

According to an aspect of the present invention, the motor control device includes a q-axis current and d-axis current detection unit configured to detect a q-axis current and a d-axis current of a permanent magnet synchronous motor having a stator provided with one of a group of windings and a group of permanent magnets and a rotor provided with the other thereof, based on at least two of a first phase current, a second phase current and a third phase current flowing through the permanent magnet synchronous motor and a position of the rotor, a q-axis current command value generation unit configured to generate a q-axis current command value based on a speed command value for the rotor, a d-axis current command value generation unit configured to generate a d-axis current command value, in which an amount of rise in the temperature of the permanent magnets in a steady state of the permanent magnet synchronous motor is a minimum, based on the speed of the rotor, and a drive unit configured to drive the permanent magnet synchronous motor based on the q-axis current, the d-axis current, the q-axis current command value, and the d-axis current command value.

Preferably, the d-axis current command value, in which the amount of rise in the temperature of the permanent magnets is a minimum, is set based on a function of the amount of rise in the temperature of the permanent magnets that changes with the value of the d-axis current, and the function of the amount of rise in the temperature of the permanent magnets that changes with the value of the d-axis current is set for each speed of the rotor.

Preferably, the d-axis current command value, in which the amount of rise in the temperature of the permanent magnets is a minimum, is set based on a function of the value of the d-axis current that changes with the speed of the rotor.

Preferably, the function of the value of the d-axis current that changes with the speed of the rotor is set based on an eddy-current loss and a copper loss of the permanent magnet synchronous motor.

Preferably, the function of the value of the d-axis current that changes with the speed of the rotor is set based on the temperature of the permanent magnets measured for each speed of the rotor.

Preferably, the function of the value of the d-axis current that changes with the speed of the rotor is approximated by at least one straight line.

According to the present invention, the d-axis current command value, in which the amount of rise in the temperature of the permanent magnet in the steady state of the permanent magnet synchronous motor is a minimum, is generated based on the speed of the rotor, and therefore, it is possible to reduce the amount of rise in the temperature of the permanent magnets in the steady state of the permanent magnet synchronous motor to a minimum. Consequently, the loss does not concentrate on the stator or rotor provided with the permanent magnets, and therefore, the permanent magnet is not brought into the overheating state and it is possible to avoid the state where thermal demagnetization of the permanent magnet occurs due to overheating.

BRIEF DESCRIPTION OF THE DRAWINGS

The objects, features, and advantages of the present invention will be clear by the description of the following embodiments relating to the accompanying drawings. In the drawings.

DETAILED DESCRIPTION

Embodiments of the motor control device according to the present invention are explained with reference to the drawings.

Figure 1:
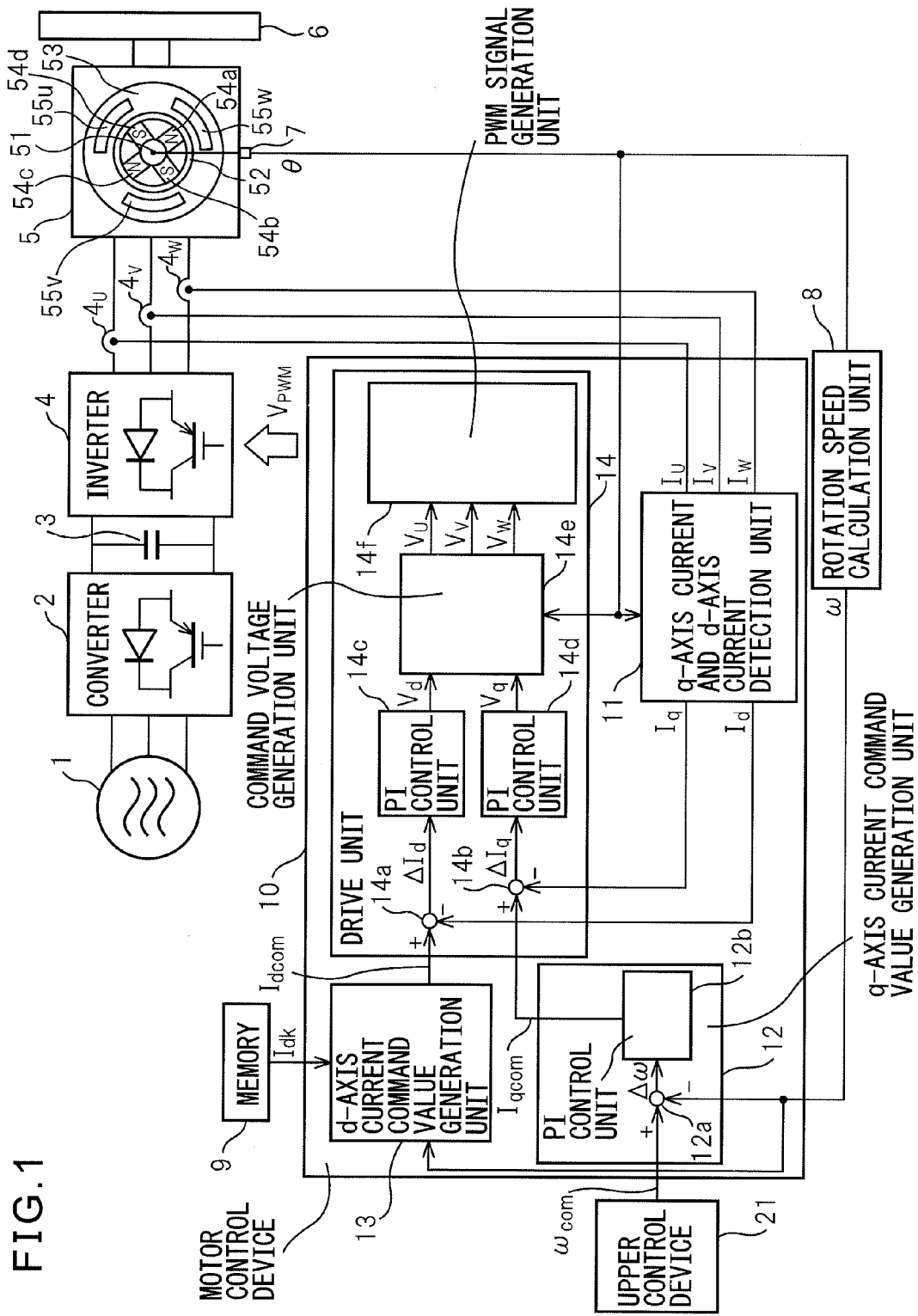
FIG. 1 is a block diagram of a system having a motor control device of an embodiment of the present invention.

Referring to the drawings, FIG. 1 is a block diagram of a system having a motor control device of an embodiment of the present invention. The system shown in FIG. 1 has a three-phase AC power source 1, a converter 2, a smoothing capacitor 3, an inverter 4, a permanent magnet synchronous motor 5, a driven object 6, a rotation angle detection unit 7, a rotation speed calculation unit 8, a memory 9, a motor control device 10, and an upper control device 21.

The converter 2 consists of a plurality (six, in the case of three-phase AC) of rectifier diodes and transistors connected in inverse parallel to the rectifier diodes, respectively, for example, and converts AC power supplied from the three-phase AC power source 1 into DC power. The smoothing capacitor 3 is connected in parallel to the converter 2 in order to smooth a voltage rectified by the rectifier diode of the converter 2. The inverter 4 is connected in parallel to the smoothing capacitor 3, consists of a plurality (six in the case of three-phase AC) of rectifier diodes and transistors connected in inverse parallel to the rectifier diodes, respectively, for example, and converts the DC power into which converted by the converter 2 into AC power by turning on and off the transistor based on a PWM signal $V_{PWM}$, to be explained later.

The permanent magnet synchronous motor 5 may be any motor to which the driven object 6, such as a table connected to the permanent magnet synchronous motor 5, an arm connected thereto, and a work attached to the table or the arm and detached from the table or the arm, is connected and which is configured to change the position and attitude of the table that holds the work in a machine tool or to rotate and operate an arm of a robot, etc. In the present embodiment, the permanent magnet synchronous motor 5 is a rotary servomotor including a rotor 52 as a rotor having a rotating shaft 51 to which the rotation angle detection unit 7 is attached and a stator 53 as a stator arranged so as to surround the rotor 52.

The rotor 52 has four permanent magnets 54a, 54b, 54c, and 54d arranged at 90° intervals. The permanent magnets 54a, 54b, 54c, and 54d are arranged so that the end parts thereof on the side of the stator 53 are separated 90° from one another in the rotation direction of the rotor 52 and the end parts on the outside of the permanent magnets 54a, 54b, 54c, and 54d are alternately the N pole, S pole, N pole, and S pole.

The stator 53 has three windings 55u, 55v, and 55w arranged at 120° intervals and to which a U-phase current $I_U$, a V-phase current $I_V$, and a W-phase current $I_W$ as a first phase current, a second phase current, and a third phase current are supplied, respectively. Consequently, the permanent magnet synchronous motor 3 functions as a three-phase synchronous motor.

In the present embodiment, the stator 53 has coils (the windings 55u, 55v, 55w) and serves as a primary side that receives power and the rotor 52 has the magnets (the permanent magnets 54a, 54b, 54c, 54d) and serves as a secondary side that is subjected to forces from the primary side.

The rotation angle detection unit 7 consists of a rotary encoder configured to detect a rotation angle θ of the rotor 52 as a position of the rotor. The rotation speed calculation unit 8 calculates a rotation speed ω of the rotor 52 corresponding to the frequency of the U-phase current $I_U$, the V-phase current $I_V$, and the W-phase current $I_W$ as the speed of the rotor by differentiating the rotation angle θ, which is input to the rotation speed calculation unit 8, with respect to time, and outputs the rotation speed ω to the motor control device 10.

Figures 2, 3:
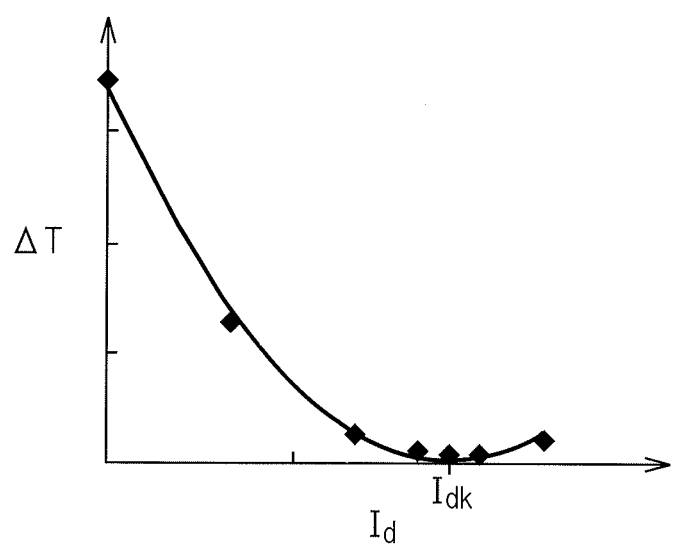
FIG. 2 is a diagram showing an example of a lookup table of rotation speeds and d-axis currents, in which an amount of rise in the temperature of a permanent magnet is a minimum.
FIG. 3 is a graph representing a function of the amount of rise in the temperature of the permanent magnet that changes with the value of the d-axis current.

The memory 9 stores a lookup table of rotation speeds $\omega_k$ (k=1, 2, ... n) and d-axis current values $I_{dk}$ (k=1, 2, ... n), in which an amount of rise in the temperature ΔT of the permanent magnets 54a, 54b, 54c, and 54d in the steady state of the permanent magnet synchronous motor 5 is a minimum, as shown in FIG. 2.

A function of the amount of rise in the temperature ΔT that changes with the value of a d-axis current $I_d$ is calculated using the finite element method analysis for each of the rotation speeds $\omega_k$ (k=1, 2, ... n), and the function can be represented by a graph as shown in FIG. 3. Consequently, it is possible to create the lookup table shown in FIG. 2 by calculating the d-axis current values $I_{dk}$ (k=1, 2, ... n) in advance for each of the rotation speeds $\omega_k$ (k=1, 2, ... n) using the graph as shown in FIG. 3 and by using the calculated d-axis current values $I_{dk}$ (k=1, 2, ... n). In the graph shown in FIG. 3, the function of the amount of rise in the temperature ΔT that changes with the value of the d-axis current $I_d$ of the permanent magnet synchronous motor 5 is set under the condition that the value of a q-axis current $I_q$ of the permanent magnet synchronous motor 5 is constant (for example, zero), however, the amount of rise in the temperature ΔT also changes with the change in the value of the q-axis current $I_q$, and therefore, it may also be possible to take into consideration the value of the q-axis current $I_q$ when calculating the d-axis current values $I_{dk}$ (k=1, 2, ... n).

Consequently, the d-axis current values $I_{dk}$ (k=1, 2, ... n) are set based on the function of the amount of rise in the temperature ΔT that changes with the value of the d-axis current $I_d$, and the function of the amount of rise in the temperature ΔT that changes with the value of the d-axis current $I_d$ is set for each of the rotation speeds $\omega_k$ (k=1, 2, ... n).

On the other hand, when the eddy-current loss is predominant in the iron loss of the rotor 52 and the copper loss is predominant in the stator 53, it is possible to express the amount of rise in the temperature ΔT by the following equation:

$$\Delta T = (aI_q^2 + b(c+I_d)^2)\omega^2 + d(I_q^2 + I_d^2) \quad (1)$$

a, b, c, d: Constant determined by a shape, material and cooling conditions of the permanent magnet synchronous motor When the constants a, b, c, and d are determined, the amount of rise in the temperature ΔT is calculated while varying values of the d-axis current $I_d$ and the q-axis current $I_q$ in the measurement or simulation (for example, magnetic analysis) of the amount of rise in the temperature ΔT, and thus the constants a, b, c, and d, in which a difference between the amount of rise in the temperature ΔT and the equation (1) is a minimum, are selected by using approximation, such as the least squares method.

By partially differentiating the equation (1) with respect to the d-axis current $I_d$ and setting a left-hand side thereof to 0, it is possible to express the d-axis current $I_d$, in which the amount of rise in the temperature ΔT of the permanent magnets 54a, 54b, 54c, and 54d in the steady state of the permanent magnet synchronous motor 5 is a minimum, by the following equation:

$$I_d = -\frac{b\omega^2}{b\omega^2+d}c \quad (2)$$

Figure 4:
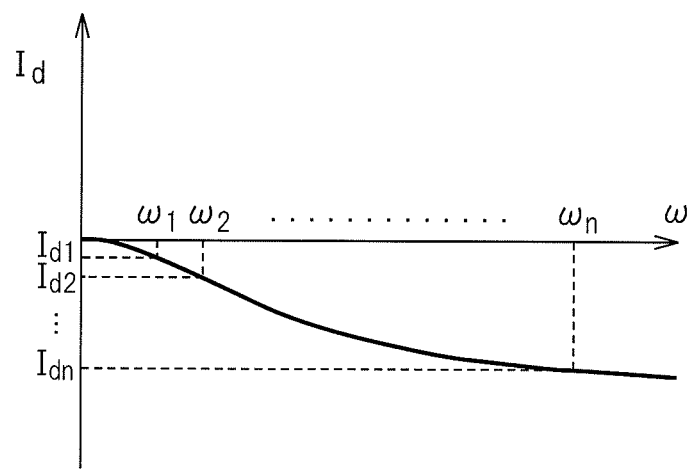
FIG. 4 is a graph representing a function of the value of the d-axis current, in which the amount of rise in the temperature of the permanent magnet that changes with the rotation speed is a minimum.

The equation (2) can be represented by a graph as shown in FIG. 4 and it is also possible to create the lookup table shown in FIG. 2 by calculating the d-axis current values $I_{dk}$ (k=1, 2, ... n) in advance for each of the rotation speeds $\omega_k$ (k=1, 2, ... n) using the graph as shown in FIG. 4 and by using the calculated d-axis current values $I_{dk}$ (k=1, 2, ... n).

Figure 5:
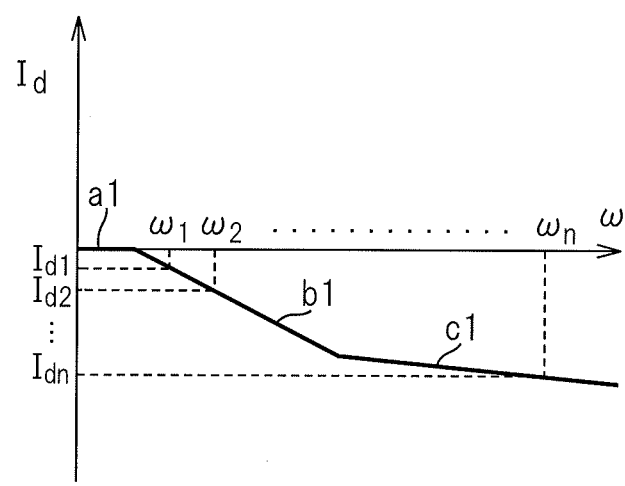
FIG. 5 is a graph representing a function that approximates the function of the value of the d-axis current, in which the amount of rise in the temperature of the permanent magnet that changes with the rotation speed is a minimum, by three straight lines.

Consequently, the d-axis current values $I_{dk}$ (k=1, 2, ... n) are set based on the function of the value of the d-axis current $I_d$ that changes with the rotation speed ω, and the function of the value of the d-axis current $I_d$ that changes with the rotation speed ω is set based on the eddy-current loss and copper loss of the permanent magnet synchronous motor 5. The graph shown in FIG. 4, that is, the function of the value of the d-axis current $I_d$ that changes with the rotation speed ω can be expressed (approximated) by three straight lines a1, b1, and c1 as shown in FIG. 5, and it is also possible to create the lookup table shown in FIG. 2 by calculating the d-axis current values $I_{dk}$ (k=1, 2, ... n) in advance for each of the rotation speeds $\omega_k$ (k=1, 2, ... n) using the graph as shown in FIG. 5 and by using the calculated d-axis current values $I_{dk}$ (k=1, 2, ... n).

Figure 6:
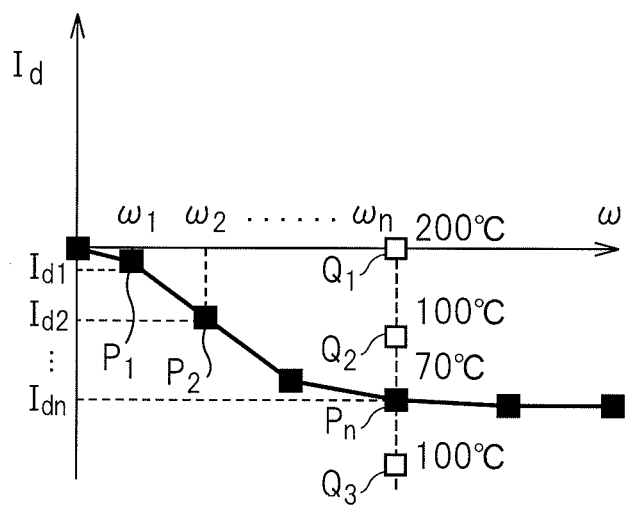
FIG. 6 is a graph representing the function of the value of the d-axis current, in which the amount of rise in the temperature of the permanent magnet that changes with the rotation speed is a minimum.

Further, as shown in FIG. 6, it is possible to draw a graph representing the function of the value of the d-axis current $I_d$ that changes with the rotation speed ω by measuring the temperature of the permanent magnets 54a, 54b, 54c, and 54d while varying the value of the d-axis current $I_d$ for each of the rotation speeds $\omega_k$ (k=1, 2, ... n) and by plotting points ($P_1$, $P_2$, $P_r$, etc.), in which the temperature is a minimum.

For example, when the temperature of the permanent magnets 54a, 54b, 54c and 54d becomes 200° C. at point $Q_1$, the temperature of the permanent magnets 54a, 54b, 54c and 54d becomes 100° C. at point $Q_2$, the temperature of the permanent magnets 54a, 54b, 54c and 54d becomes 70° C. at point $P_n$ and the temperature of the permanent magnets 54a, 54b, 54c and 54d becomes 100° C. at point $Q_3$ by varying the value of the d-axis current $I_d$ at the rotation speed $\omega_n$, the point $P_n$ is selected as a point, in which the temperature is a minimum.

When the graph as shown in FIG. 6 is drawn, the temperature of the permanent magnets 54a, 54b, 54c, and 54d is acquired by attaching a temperature sensor to the rotor 52 so that the temperature sensor is in close proximity to the permanent magnet 54a, 54b, 54c or 54d and deeming the temperature detected by the temperature sensor to be the temperature of the permanent magnets 54a, 54b, 54c and 54d.

It is also possible to create the lookup table shown in FIG. 2 by calculating the d-axis current values $I_{dk}$ (k=1, 2, ... n) in advance for each of the rotation speeds $\omega_k$ (k=1, 2, ... n) using the graph as shown in FIG. 6 and by using the calculated d-axis current values $I_{dk}$ (k=1, 2, ... n).

Consequently, the d-axis current values $I_{dk}$ (k=1, 2, ... n) are set based on the function of the value of the d-axis current $I_d$ that changes with the rotation speed ω, and the function of the value of the d-axis current $I_d$ that changes with the rotation speed ω is set based on the temperature of the permanent magnets 54a, 54b, 54c, and 54d measured for each rotation speed ω.

Figure 7:
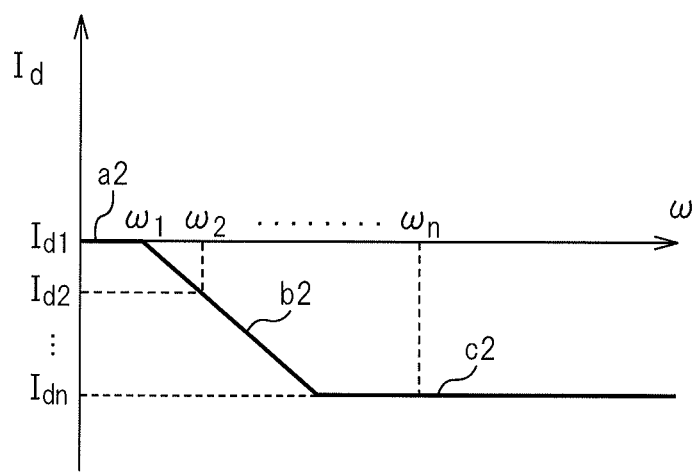
FIG. 7 is a graph representing a function that approximates the function of the value of the d-axis current, in which the amount of rise in the temperature of the permanent magnet that changes with the rotation speed is a minimum, by three straight lines.

The graph shown in FIG. 6, that is, the function of the value of the d-axis current $I_d$ that changes with the rotation speed ω can be expressed (approximated) by three straight lines a2, b2, and c2 as shown in FIG. 7, and it is also possible to create the lookup table shown in FIG. 2 by calculating the d-axis current values $I_{dk}$ (k=1, 2, ... n) in advance for each of the rotation speeds $\omega_k$ (k=1, 2, ... n) using the graph as shown in FIG. 7 and by using the calculated d-axis current values $I_{dk}$ (k=1, 2, ... n).

The motor control device 10 performs vector control to independently control the q-axis current and the d-axis current of the permanent magnet synchronous motor 5 in order to generate a torque of the permanent magnet synchronous motor 5 in a quick and stable manner. To do this, the motor control device 10 includes a q-axis current and d-axis current detection unit 11, a q-axis current command value generation unit 12, a d-axis current command value generation unit 13, and a drive unit 14.

In the present embodiment, the rotation speed calculation unit 8, the memory 9, the q-axis current and d-axis current detection unit 11, the q-axis current command value generation unit 12, the d-axis current command value generation unit 13, and the drive unit 14 are implemented by a processor including an input and output port, a serial communication circuit, an A/D converter, a timer, etc., and perform processing, to be explained later, in accordance with processing programs stored in a memory not shown in the drawings.

The q-axis current and d-axis current detection unit 11 detects the q-axis current $I_q$ and the d-axis current $I_d$ based on three phases of the U-phase current $I_U$, the V-phase current $I_V$, and the W-phase current $I_W$ flowing through the permanent magnet synchronous motor 5 and the rotation angle θ. To do this, the q-axis current and d-axis current detection unit 11 consists of a coordinate converter configured to perform rotation coordinate conversion and three-phase to two-phase conversion. Consequently, the three phases of the U-phase current $I_U$, the V-phase current $I_V$, and the W-phase current $I_W$ in the stationary coordinate system (UVW coordinate system) into two phases of the q-axis current $I_q$ and the d-axis current $I_d$ expressed by the rotation coordinate system rotated by the rotation angle θ with respect to the stationary coordinate system (αβ coordinate system), and outputs the q-axis current $I_q$ and the d-axis current $I_d$ to the drive unit 14.

In this case, the three phases of the U-phase current $I_U$, the V-phase current $I_V$, and the W-phase current $I_W$ are detected by current detection units 4U, 4V, and 4W provided in the output lines of the inverter 4 and current detection signals output by the current detection units 4U, 4V, and 4W are input to an A/D converter not shown in the drawings, and converted into digital data. The current detection units 4U, 4V, and 4W consists of hole elements, for example.

The q-axis current command value generation unit 12 generates a q-axis current command value $I_{qcom}$ based on a rotation speed command value $\omega_{com}$ as a speed command value for a rotor. To do this, the q-axis current command value generation unit 12 has a subtracter 12a and a PI control unit 12b.

The subtracter 12a has a non-inversion input part to which the rotation speed command value $\omega_{com}$ is input, an inversion input part to which the rotation speed $\omega$ is input, and an output part configured to output a rotation speed deviation $\Delta\omega$, which is a result of subtraction between the rotation speed command value $\omega_{com}$ and the rotation speed $\omega$. The rotation speed deviation $\Delta\omega$ is input to the PI control unit 12b, and the PI control unit 12b generates the q-axis current command value $I_{qcom}$ by making proportional integration calculation of the rotation speed deviation $\Delta\omega$ and outputs the q-axis current command value $I_{qcom}$ to the drive unit 14.

The rotation speed $\omega$ is input to the d-axis current command value generation unit 13, and the d-axis current command value generation unit 13 generates a d-axis current command value $I_{dcom}$, in which the amount of rise in the temperature of the permanent magnets 54a, 54b, 54c, and 54d in the steady state of the permanent magnet synchronous motor 5 is a minimum, based on the rotation speed $\omega$ and outputs the d-axis current command value $I_{dcom}$ to the drive unit 14. For example, when the rotation speeds $\omega_k$ (k=1, 2, ... n) are input to the d-axis current command value generation unit 13, the d-axis current command value generation unit 13 reads the d-axis current values $I_{dk}$ (k=1, 2, ... n) corresponding to the rotation speeds $\omega_k$ (k=1, 2, ... n) from the lookup table stored in the memory 9 and outputs the d-axis current command values $I_{dcom}$ corresponding to the d-axis current values $I_{dk}$ (k=1, 2, ... n) to the drive unit 14.

The drive unit 14 drives the permanent magnet synchronous motor 5 based on the q-axis current $I_q$, the d-axis current $I_d$, the q-axis current command value $I_{qcom}$, and the d-axis current command value $I_{dcom}$. To do this, the drive unit 14 has subtracters 14a and 14b, PI control units 14c and 14d, a command voltage generation unit 14e, and a PWM signal generation unit 14f.

The subtracter 14a has a non-inversion input part to which the d-axis current command value $I_{dcom}$ is input, an inversion input part to which the d-axis current $I_d$ is input, and an output part configured to output a current deviation $\Delta I_d$, which is a result of subtraction between the d-axis current command value $I_{dcom}$ and the d-axis current $I_d$. The subtracter 14b has a non-inversion input part to which the q-axis current command value $I_{qcom}$ is input, an inversion input part to which the q-axis current $I_q$ is input, and an output part configured to output a current deviation $\Delta I_q$, which is a result of subtraction between the q-axis current command value $I_{qcom}$ and the q-axis current $I_q$.

The current deviation $\Delta I_d$ is input to the PI control unit 14c, and the PI control unit 14c generates a d-axis voltage command value $V_d$ by making proportional integral calculation of the current deviation $\Delta I_d$ and outputs the d-axis voltage command value $V_d$ to the drive unit 14. To the PI control unit 14d, the current deviation $\Delta I_q$ is input and the PI control unit 14d generates a q-axis voltage command value $V_q$ by making proportional integral calculation of the current deviation $\Delta I_q$ and outputs the q-axis voltage command value $V_q$ to the drive unit 14.

The command voltage generation unit 14e generates a U-phase voltage command value $V_U$, a V-phase voltage command value $V_V$, and a W-phase voltage command value $V_W$ based on the d-axis voltage command value $V_d$ and the q-axis voltage command value $V_q$. To do this, the command voltage generation unit 14e consists of a coordinate converter configured to perform rotation coordinate conversion and two-phase to three-phase conversion. Consequently, the command voltage generation unit 14e converts two phases of the d-axis voltage command value $V_d$ and the q-axis voltage command value $V_q$ expressed by the rotation coordinate system rotated by the rotation angle $\theta$ with respect to the stationary coordinate system ($\alpha\beta$ coordinate system) into three phases of the U-phase voltage command value $V_U$, the V-phase voltage command value $V_V$ and the W-phase voltage command value $V_W$, and outputs the U-phase voltage command value $V_U$, the V-phase voltage command value $V_V$, and the W-phase voltage command value $V_W$ to the PWM signal generation unit 14f.

The PWM signal generation unit 14f generates a PWM signal $V_{PWM}$ (in this case, $V_{PWM1}$, $V_{PWM2}$, $V_{PWM3}$, $V_{PWM4}$, $V_{PWM5}$, and $V_{PWM6}$ corresponding to each transistor of the inverter 4) based on the U-phase voltage command value $V_U$, the V-phase voltage command value $V_V$, and the W-phase voltage command value $V_W$, and outputs the PWM signal $V_{PWM}$ to the inverter 4 to drive the permanent magnet synchronous motor 5.

The upper control unit 21 consists of a CNC (computer numerical control), etc., and inputs the rotation speed command value $\omega_{com}$ to the non-inversion input part of the subtracter 12a.

According to the present embodiment, the d-axis current command value $I_{dcom}$, in which the amount of rise in the temperature $\Delta T$ of the permanent magnets 54a, 54b, 54c and 54d in the steady state of the permanent magnet synchronous motor 5 is a minimum, is generated based on the rotation speed $\omega$, and therefore, it is possible to reduce the amount of rise in the temperature $\Delta T$ of the permanent magnets 54a, 54b, 54c and 54d in the steady state of the permanent magnet synchronous motor 5 to a minimum. Consequently, the loss does not concentrate on the rotor 52 provided with the permanent magnets 54a, 54b, 54c, and 54d. that is, on the secondary side, and therefore, the permanent magnets 54a, 54b, 54c and 54d are not brought into an overheating state and it is possible to avoid the state where thermal demagnetization of the permanent magnets 54a, 54b, 54c and 54d occurs due to overheating. Further, in the present embodiment, the use of a magnet with a small magnetic force or modification of hardware, such as extension of a magnetic gap, is not necessary in order to avoid the state where thermal demagnetization of the permanent magnets 54a, 54b, 54c, and 54d occurs due to overheating.

The present invention is not limited to the above-mentioned embodiments and there can be a number of alterations and modifications. For example, in the above-mentioned embodiments, the case where the rotary servomotor in which the permanent magnets 54a, 54b, 54c, and 54d are provided in the rotor 52 is used as the permanent magnet synchronous motor 5 is explained, however, it is possible to use a rotary servomotor in which permanent magnets are provided in the stator, a linear servomotor in which permanent magnets are provided in any one of a stator and a slider, a vibration servomotor in which permanent magnets are provided in any one of a stator and a vibrator, etc., as the permanent magnet synchronous motor 5.

Further, the rotation angle detection unit 7 can consist of a part (for example, hole element or resolver) other than the rotary encoder. Furthermore, it is also possible to omit the rotation angle detection unit 7 and to calculate the rotation angle $\theta$ and the rotation speed $\omega$ based on the AC current and AC voltage supplied to the permanent magnet synchronous motor 5.

In the above-mentioned embodiments, the memory 9 is explained as part of the processor, however, it is also possible to configure the memory 9 as a part outside the processor. Further, it is also possible to provide the memory 9 within the magnetism generation current command value generation unit 13.

In the above-mentioned embodiments, the case where the three phases of the U-phase current $I_U$, the V-phase current $I_V$ and the W-phase current $I_W$ are used in order to detect the q-axis current $I_q$ and the d-axis current $I_d$ is explained, however, it is also possible to detect the q-axis current $I_q$ and the d-axis current $I_d$ by using any two phases among the three phases of the U-phase current $I_U$, the V-phase current $I_V$ and the W-phase current $I_W$ in three phases (for example, the V-phase current $I_V$ and W-phase current $I_W$). In the above-mentioned embodiments, the case where the lookup table is used to acquire the d-axis current value $I_{dk}$ is explained, however, it is also possible to acquire the d-axis current value $I_{dk}$ by storing the equation that expresses the graph of the function of FIG. 3, FIG. 4, FIG. 5, FIG. 6 or FIG. 7 or an approximate equation that can be easily conceived therefrom (for example, an approximate equation, which is the equation that expresses the graph of the function of FIG. 3, FIG. 4, or FIG. 6 to which a small constant term is only added). The equation that expresses the graph of the function of FIG. 3, FIG. 4, FIG. 5 or FIG. 6 in advance, substituting the rotation speed ω in one of these equations, and calculating the d-axis current value $I_{dk}$.

In the above-mentioned embodiments, the case where the graph of the function of FIG. 4 or FIG. 6 is expressed (approximated) by the three straight lines is explained, however, it is also possible to express (approximate) the graph of the function of FIG. 4 or FIG. 6 by at least one straight line or smoothing line.

Further, in the above-mentioned embodiments, the case where the upper control device 21 is used to output the rotation speed command value $\omega_{com}$ is explained, however, it is also possible to use a control device other than the upper control device 21 to output the rotation speed command value $\omega_{dcom}$.

As above, the present invention is explained in relation to the preferred embodiments thereof, however, persons skilled in the art should understand that there can be a variety of alterations and modifications without deviating from the scope of claims, as described later.

The invention claimed is:

1. A motor control device comprising:
a q-axis current and d-axis current detection unit configured to detect a q-axis current and a d-axis current of a permanent magnet synchronous motor having a stator provided with one of a group of windings and a group of permanent magnets and a rotor provided with the other thereof, based on at least two of a first phase current, a second phase current and a third phase current flowing through the permanent magnet synchronous motor and a position of the rotor;
a q-axis current command value generation unit configured to generate a q-axis current command value based on a speed command value for the rotor;
a d-axis current command value generation unit configured to generate a d-axis current command value, in which an amount of rise in the temperature of the permanent magnets in a steady state of the permanent magnet synchronous motor is a minimum, based on a speed of the rotor; and
a drive unit configured to drive the permanent magnet synchronous motor based on the q-axis current, the d-axis current, the q-axis current command value, and the d-axis current command value.

2. The motor control device according to claim 1, wherein the d-axis current command value, in which the amount of rise in the temperature of the permanent magnets is a minimum, is set based on a function of the amount of rise in the temperature of the permanent magnets that changes with the value of the d-axis current and the function of the amount of rise in the temperature of the permanent magnets that changes with the value of the d-axis current is set for each speed of the rotor.

3. The motor control device according to claim 1, wherein the d-axis current command value, in which the amount of rise in the temperature of the permanent magnets is a minimum, is set based on the function of the value of the d-axis current that changes with the speed of the rotor.

4. The motor control device according to claim 3, wherein the function of the value of the d-axis current that changes with the speed of the rotor is set based on an eddy-current loss and a copper loss of the permanent magnet synchronous motor.

5. The motor control device according to claim 3, wherein the function of the value of the d-axis current that changes with the speed of the rotor is set based on the temperature of the permanent magnets measured for each speed of the rotor.

6. The motor control device according to claim 3, wherein the function of the value of the d-axis current that changes with the speed of the rotor is approximated by at least one straight line.

* * * * *